United States Patent
Reynoso (10) Patent No.: US 11,585,314 B1
(45) Date of Patent: Feb. 21, 2023

(54) DIFFERENTIAL AMBIENT PRESSURE POWERED HYDRAULICALLY DRIVEN GENERATOR BATTERY

(71) Applicant: Bryan Christopher Reynoso, Ponte Vedra Beach, FL (US)

(72) Inventor: Bryan Christopher Reynoso, Ponte Vedra Beach, FL (US)

( * ) Notice: Subject to any disclaimer, the term of this patent is extended or adjusted under 35 U.S.C. 154(b) by 0 days.

(21) Appl. No.: 17/648,315

(22) Filed: Jan. 19, 2022

(51) Int. Cl.
*F03B 13/10* (2006.01)
*F03B 17/02* (2006.01)
*B63G 8/24* (2006.01)
*B63G 8/22* (2006.01)
*F16K 27/04* (2006.01)
*F16K 31/122* (2006.01)

(52) U.S. Cl.
CPC ............... *F03B 13/10* (2013.01); *B63G 8/22* (2013.01); *B63G 8/24* (2013.01); *F03B 17/025* (2013.01); *F16K 27/04* (2013.01); *F16K 31/122* (2013.01); *F16K 27/041* (2013.01); *F16K 31/1221* (2013.01)

(58) Field of Classification Search
CPC .......... F03B 13/10; F03B 17/025; B63G 8/22; B63G 8/24; F16K 27/04; F16K 31/122; F16K 27/041; F16K 31/1221
USPC ................................... 60/325, 496
See application file for complete search history.

(56) References Cited

U.S. PATENT DOCUMENTS

| | | | | |
|---|---|---|---|---|
| 3,542,332 A | * | 11/1970 | Chevalier | F16K 31/1221 251/367 |
| 3,665,884 A | * | 5/1972 | Gustafson | B63G 8/22 114/333 |
| 4,207,741 A | | 6/1980 | Rainey | |
| 4,919,637 A | * | 4/1990 | Fleischmann | A63H 23/04 446/155 |
| 5,771,931 A | * | 6/1998 | Watson | F16K 31/1221 137/236.1 |
| 5,921,082 A | | 7/1999 | Berling | |
| 6,812,588 B1 | | 11/2004 | Zadig | |
| 6,981,373 B2 | * | 1/2006 | Robinson | F03B 17/02 417/330 |
| 2003/0019207 A1 | * | 1/2003 | Parker | F03B 11/00 60/398 |
| 2016/0208770 A1 | | 7/2016 | Saavedra | |

* cited by examiner

*Primary Examiner* — Hoang M Nguyen
(74) *Attorney, Agent, or Firm* — Defillo & Associates, Inc.; Evelyn A. Defillo (57) ABSTRACT

The system utilizes fluid pressure achieved by increasing depth as a primary component for generation of energy. The system operates by varying its depth through changes in buoyancy. The ballast changes are controlled by electronics powered by a battery charged by a generator driven by a hydraulic system. Rather than utilizing a motor driven pump to generate pressure in the hydraulic system, a piston-like cylinder is applied pressure by the change in hydrostatic pressure as depth increases and draws fluid back into the cylinder as pressure decreases. As the system sinks, outside pressure forces hydraulic fluid to power a generator that charges a battery and powers a pump to deballast. As the system rises, the lowering of ambient pressure, and other internal forces, causes the hydraulic fluid to return to its initial state, where once the ballast begins to take in fluid, the whole process will continue to repeat.

4 Claims, 10 Drawing Sheets

Closed Position – At Increased Depth

DIFFERENTIAL AMBIENT PRESSURE POWERED HYDRAULICALLY DRIVEN GENERATOR BATTERY

TECHNICAL FIELD OF THE INVENTION

The invention relates to the field of power generation. More particularly, the invention relates to a system that utilizes the fluid pressure achieved by increasing depth as a primary component to activate a hydraulic cylinder in the generation of energy.

BACKGROUND OF THE INVENTION

As societies continue to flourish and advance, the demand for power generation continues to increase. Currently, there is growing concern about a lack of sustainable energy sources. Electricity is currently produced in the majority by hydraulic energy conversion, carbon-based thermal energy conversion, and nuclear thermal energy conversion. The hydraulic power is the most significant source of energy.

The prior art shows a plurality of hydraulic power systems employing a buoyant element or elements that cyclically move in response to rising and falling levels of liquid within a receptable in which the buoyant element is located. Many attempts have been made to convert the energy contained in waves into electricity. Unfortunately, the construction and handling of the known systems is difficult and complex and depends on the water conditions.

Although the known hydraulic system to produce energy has served the world well and will continue to serve us well for years to come, the growing limitations and disadvantages of these sources of energy are becoming more evident.

For example, U.S. Pat. No. 5,921,082 discloses a hydro-buoyant electrical power generating plant that generates electricity from a source of hydraulic pressure. The energy that pressurizes the hydraulic fluid is derived from movements of a lever arm that has its fulcrum fixed to a stationary land mass, so that the fulcrum's position is fixed relative to the lever's opposite "movable" end. A cylinder drives the hydraulics, but the cylinder is driven by a moving "weight" attached to the lever arm that is manually pumping the cylinder. This reference requires that a fluid be externally pumped in and out in order for the object to move vertically through the water column. This motion then drives a hydraulic cylinder that then utilizes this pressure for energy generation. The reference uses a mechanical motion of buoyancy to drive a commonly used existing hydraulics system to generate power. Unfortunately, this system requires a large change in ballast weight in order to accomplish the force required for this mechanical driving of hydraulic cylinders.

Another example is US Patent Application Publication No. 2016/0208770, which discloses a power generator that generates power using buoyancy of a body located in a fluid column to generate electricity. The device includes a fluid column contained by a tank inside a piston. The piston has a hollow interior, capable of being filled with a fluid. The piston includes an inlet, operating from a filling position to a non-filling position, located on a top portion of the piston and also a rod connected to a power generator. A ballast device is connected to the piston. This invention has a cylinder that drives hydraulics, but the cylinder is driven by a moving "weight" that acts in line with the cylinder. This reference requires that a fluid be externally pumped in and out in order for the object to move vertically through the water column. This motion then drives a hydraulic cylinder that then utilizes this pressure for energy generation. The reference uses a mechanical motion of buoyancy to drive a commonly used existing hydraulics system to generate power. Unfortunately, the Berling system requires a large change in ballast weight in order to accomplish the force required for this mechanical driving of hydraulic cylinders. In order to generate any meaningful electricity, a large amount of fluid should be pushed into the hydraulic motor driving the generator. In order to push a large amount of fluid, the cylinder would need to have a large displacement. The larger the displacement, the more force required to move the cylinder. More force is only generated by adding more weight (in this case, water weight) to the system for operation. This means there is an even larger amount of energy consumption for the pumping of water into the object.

There is a need to have an energy production system that does not depend on water conditions and that does not require costly and complicated infrastructure.

SUMMARY OF THE INVENTION

The present invention does not use the fluid weight of the buoyant object to mechanically achieve hydraulic fluid pressure, rather, the present invention uses the correlation between increasing depth and increasing pressure to act on a hydraulic cylinder in order to drive the hydraulics.

When a solid object is immersed in a fluid, it experiences pressure in all directions, known as hydrostatic pressure. The pressure increases with the depth of the fluid equal to the (gravitational) weight of the fluid above. This increasing pressure applies a force on a submerged object that increases with depth.

The system, according to the present invention, is designed to operate autonomously in a fluid, by varying its depth through changes in buoyancy. Buoyancy is changed by varying ballast. The ballast changes are powered by an on-board battery or external power. This battery can be recharged by a generator which is driven by a hydraulic system. Rather than utilizing a motor driven pump to generate pressure in the hydraulic system, a piston-like cylinder is applied pressure by the change in hydrostatic pressure as depth increases and draws fluid back into the cylinder as pressure decreases. As the system sinks, outside pressure forces hydraulic fluid to power a hydraulic motor which turns a generator. This power can later be utilized to power a pump to deballast. As the system rises, the lowering of ambient pressure, as well as other internal forces, causes the hydraulic fluid to return to its initial state, where once the ballast begins to take in fluid, the whole process will continue to repeat.

The power generation system according to the present invention includes: a housing including a cavity, an inlet is adapted to receive a fluid, and an outlet; a ballast tank is located inside the cavity of the housing, the ballast system having a first end and a second end, including an inlet connected to a flooding valve, the one flooding valve is in fluid communication with the inlet of the housing and the flooding valve is also connected to the electronics; a hydraulic system located inside the cavity of the housing and including: a hydraulic cylinder; a first relief valve having a first end connected to an outlet of the hydraulic cylinder; a hydraulic motor having a first end connected to a second end of the relief valve and a second end connected to an inlet of check valve; the check valve has a second end connected to the inlet of the pressurized tank and receives and stores under pressure the fluid received from the hydraulic motor;

a second check valve having a first end connected to an outlet of the hydraulic tank, the second check valve has a second end that is connected to an inlet of the hydraulic cylinder; a generator connected to a third side shaft of the hydraulic motor, the generator is mechanically coupled to the hydraulic motor causing rotation in order to generate electrical energy; optionally, a gearbox located between the generator and the hydraulic motor; a battery connected to the generator; and the ballast tank further including: a ballast pump connected to the electronics powered by a battery.

When a controlled amount of a fluid enters through the inlet of the ballast tank, then the system starts sinking by changing from a positive buoyancy to a negative buoyancy and as the depth of the system increases, an external hydrostatic pressure increases, moving the hydraulic cylinder from a first position to a second position, the movement of the hydraulic cylinder sends the pressurized fluid into the hydraulic motor, which in turn activates the generator, which in turn produces electrical energy, and the pressurized fluid leaves the hydraulic motor into a pressurized tank.

When a predetermined amount of the electrical energy has been generated and/or a specific depth has been reached, the ballast pump is activated by the on-board electronics to expel a predetermined amount of the fluid.

When the predetermined amount of the fluid is expelled, the system starts rising, by changing from negatively buoyant to positively buoyant.

When rising, the external pressure decreases and the hydraulic cylinder moves from the second position to the first position with the aid of other internal forces located in the pressurized tank.

A flooding valve having a case having a hollow interior, a first side, a second side, a bottom side, an inlet located on the first side, and an outlet located at the bottom side of the case; a t-shaped conduit located inside the case, the t-shaped conduit having a horizontal section running from the first side to the second side of the case and a vertical section running from the horizontal section near the inlet towards the outlet of the case; a plunger is slidable inside the horizontal section and the plunger includes a small plug, a large plug, and spring between a small plug and the large plug; wherein the small plug is placed towards the first side of the case and the large plug is located towards the second side of the case; wherein when hydrostatic pressure decreases, the small plug slides inside the horizontal section of the t-shaped conduit towards the second end of the case allowing the fluid to enter through the inlet and flow towards the outlet of the case filling a reservoir; wherein when hydrostatic pressure increases, the large plug slides towards the first end of the case preventing the fluid from entering the case.

DETAILED DESCRIPTION OF THE INVENTION

In the present application, the terms "invention" or "present invention" refer to any single embodiment of the particular invention but encompasses all possible embodiments as described in any part of the specification, including but not limited to the written description and the claims.

In the present application, the terms "water" and "fluid" are used interchangeably. This disclosure will focus and refer to hydraulic fluid as the likely fluid of use, but the system is operable with a wide range of fluids used for various specific purposes. In a preferable embodiment, the fluid used may act as an incompressible fluid within certain pressure ranges.

The power generation system as described may include any of the individual components or assembly of components as disclosed herein, but also the substitutions of components, number of components, and location of components may be combined in manners not specifically shown or described herein, but which may be obvious to those skilled in the art.

The present invention is based on the principle that hydrostatic pressure increases in proportion to depth measured from the surface, because of the increasing weight of fluid exerting downward force from above. This principle is used by the present invention to produce energy in a spontaneous, harmless, renewable, and endless form.

The system of the present invention is intended to be placed in water and, utilizing external forces and internal components, will proceed to sink and rise while generating energy to complete the process. Once set in water, the system will sink down after an intake of water to a precalculated depth, then expel the water via its internal ballast system, and finally beginning to rise, where it will reset and intake water once again.

Figure 1:
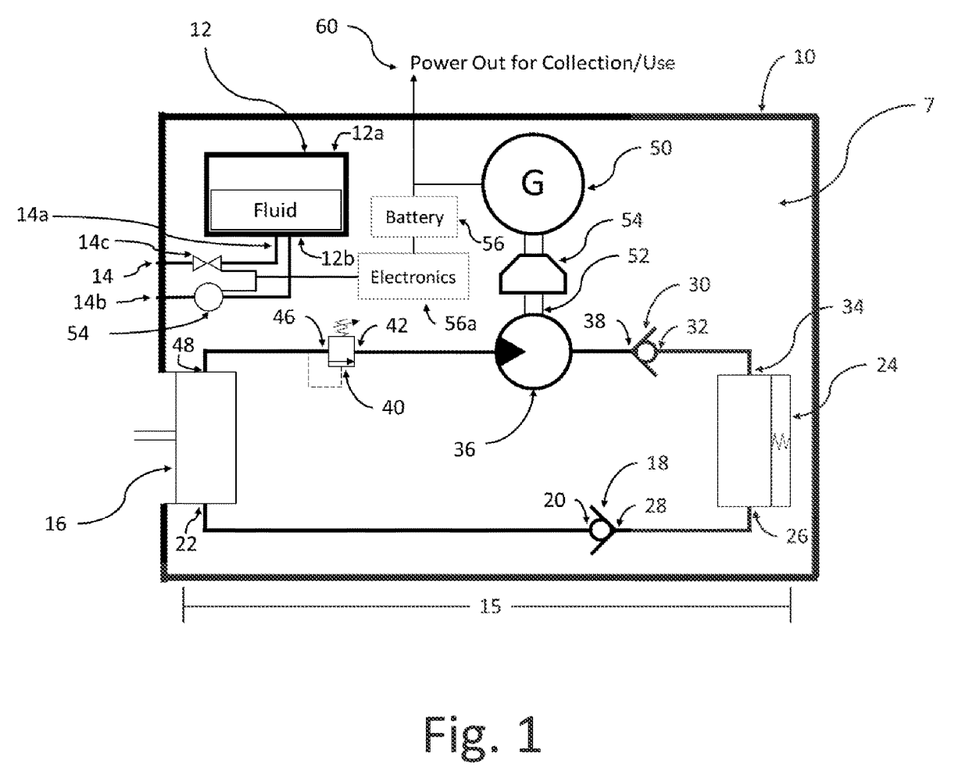
FIG. 1 shows a schematic view of the power generation system according to the present invention.

In the illustrated embodiment of the present invention, the power generation system 5 can be described as comprising a single unit with all of the components inside the cavity of the housing.

The system sinks and rises through the fluid column by being negatively or positively buoyant. When the interior of the ballast tank is flooded, the system is, to some magnitude, negatively buoyant. When the system needs to begin rising, the fluid is pumped out of the ballast tank, causing the system to become, to some magnitude, positively buoyant.

The power generation system only requires a smaller, finite amount of fluid intake, and outlet from the ballast system. This is because only downward motion is required, not the force created by downward motion. Also, no outside forces (such as hydraulic resistance) affect the motion of the object. Whereas the prior art known inventions have the calculations of ballast affecting the hydraulic force generated by the power generation system of the present invention. The hydraulic force is only dependent on depth of the housing.

FIG. 1 shows the power generation system 5 according to the present invention. The power generation system 5 includes:

a housing 10 including a cavity 7, an inlet 14 is adapted to receive a fluid, and an outlet 14b;

a ballast tank 12 is located inside the cavity 7 of the housing 10, the ballast tank 12 having a first end 12a and a second end 12b including an inlet 14a connected to a flooding valve 14c, the flooding valve 14c is in fluid communication with the inlet 14 of the housing 10 and the flooding valve 14c is connected to the electronics 56a;

a hydraulic system 15 located inside the cavity 7 of the housing 10 and includes:

a hydraulic cylinder 16;

a first relief valve 40 having a first end 46 connected to an outlet 48 of the hydraulic cylinder 16;

a hydraulic motor 36 having a first end 44a connected to a second end 42 of the relief valve 40, and a second end 44b connected to an inlet 38 of the check valve 30;

the check valve 30 has a second end 32 connected to the inlet 34 of the pressurized tank 24, which receives and stores, under pressure, the fluid received from the hydraulic motor 36;

a second check valve 18 having a first end 28 connected to an outlet 26 of the tank 24, the second check valve 18 has a second end 20 that is connected to an inlet 22 of the hydraulic cylinder 16;

a generator 50 connected to a third side shaft 52 of the hydraulic motor 36, the generator 50 is mechanically coupled to the hydraulic motor 36 to receive and use rotation in order to generate electrical energy;

optionally, a gearbox 54 is located between the generator 50 and the hydraulic motor 36;

a battery 56 is connected to the generator 50; and the ballast tank 12, further including:

a ballast pump 54 connected to the electronics 56a powered by battery 56;

wherein when a controlled amount of a fluid enters through the inlet 14a of the ballast tank 12, then the system 10 starts sinking by changing from a positive buoyancy to a negative buoyancy and as the depth of the system 10 increases, an external hydrostatic pressure increases, moving the hydraulic cylinder 16 from a first position to a second position, the movement of the hydraulic cylinder 16 sends the pressurized fluid into the hydraulic motor 36, which in turn activates the generator 50, which in turn produces electrical energy, and the pressurized fluid leaves the hydraulic motor 36 into a tank 24;

wherein when a predetermined amount of the electrical energy has been generated and/or a specific depth has been reached, the ballast pump 54 is activated by the on-board electronics 56a to expel a predetermined amount of the fluid;

wherein when the predetermined amount of the fluid is expelled, the system starts rising, by changing from negatively buoyant to positively buoyant; and wherein when rising, the external pressure decreases and the hydraulic cylinder moves from the second position to the first position, with the aid of other internal forces located in pressurized tank 24.

In one embodiment, the inlet 14 and outlet 14b of the housing 10 could be configured to have the same valve; thus, only one opening functions as inlet and outlet. In another embodiment, the system may include a plurality of inlets and outlets;

It is important that the system 5 be near to neutrally buoyant. Meaning, there will be voids, floatation, or weights to compensate for the weight and buoyancy of the system in order to calculate the system to near neutral buoyancy.

Housing 10

As shown in FIG. 1, the housing 10 including a cavity 7, an inlet 14 and an outlet 14b.

The housing 10 may have any geometrical shape, for example, cylindrical, square, rectangular, or other shaped cross section.

The fluid will be whatever fluid is outside of the system, i.e. it will be the environment, like sea water, if the system is operating in the ocean.

The amount of fluid that is required is calculated by taking into account the buoyancy of the system (without any water), the depth the system will be traveling to, and the volume of fluid that the piston will be pushing through the hydraulic motor.

Ballast Tank 12

Figure 4:
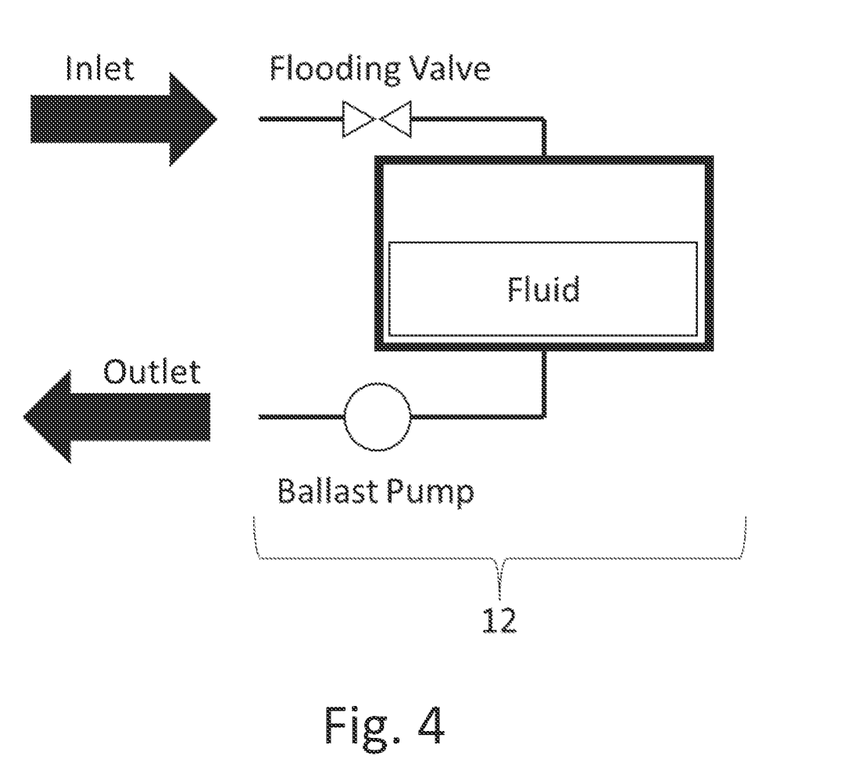
FIG. 4 shows a detailed view of the ballast system according to the present invention.

The ballast tank 12 is located inside the cavity 7 of the housing 10, the ballast tank 12 has a first end 12a and a second end 12b including an inlet 14a connected to a flooding valve 14c, the flooding valve 14c is in fluid communication with the inlet 14 of the housing 10.

As the hydraulic system 15 generates power during sinking, that power is both stored and used to power an on-board computer/controller, represented as electronics 56a. Once the controller has identified that enough power has been generated to operate the ballast pump and the flood valve, the controller will operate the pump to expel water. Once the system 5 has risen to a sufficient depth, through depth sensors or other devices of electrically or mechanically determining altitude, the controller, if needed, will operate the flood valve to open and close. The controller will then be dormant until the hydraulic system begins power generation. The flood valve, depth sensor, or other component functionality can be achieved through a variety of mechanical and/or electrical devices.

Hydraulic Cylinder 16

The hydrostatic pressure is pushing the free moving end of the hydraulic piston 16 as the system sinks. Hydraulic fluid (oil) contained within the piston is then pushed through the outlet 48 towards the relief valve 40. Fluid will not travel through piston inlet 22, since it cannot travel through the inlet 20 of the check valve 18 because of hydraulic lock. It should be understood that the piston head is the only part of the entire invention affected by hydrostatic pressure and thus, moving from the change in pressure. The housing 10 is intended to prevent the hydrostatic pressure from affecting any of the other internal components, thus, keeping the internal components "dry" from the external fluid.

The most ideal shape of any hydraulic cylinder is cylindrical, however, if the proper sealing is achievable, a hydraulic "cylinder" can theoretically be any shape. In an embodiment of the present invention, the outside of the piston would look like the piston in an engine block, however, it is possible to have a standalone hydraulic cylinder attached to the outside of the housing 10. A standalone cylinder is any typical cylinder found in a multitude of hydraulic systems.

The hydraulic system and accompanying hydraulic components are prefilled with hydraulic fluid in a closed loop, connected by hydraulic conduits. As depth increases, the hydrostatic pressure of a submerged object increases proportionally. As the invention sinks through the water column, the housing 10 and cylinder face of cylinder 16 are exposed to increasing pressure. By design, the cylinder's moving portion, the cylinder face of cylinder 16, is free to move when affected by significant pressure. The pressure required to move the cylinder face is calculated using relief set pressure of relief valve 40, the mechanical resistance on hydraulic motor 36 and whatever components are attached to the motor, the spring force or pressurization and surface area of the pressurized tank 24, and the surface area of the cylinder face of cylinder 16. These listed forces to determine initial moving pressure will be referred to as the internal hydraulic resistance. Once the initial pressure required to begin moving the cylinder face is achieved, the cylinder face will start applying pressure to the hydraulic fluid, thus moving hydraulic fluid through the downstream components. The speed at which the cylinder face moves is dependent on the internal hydraulic resistance and the speed at which the invention sinks. As the hydraulic fluid is pressed by the cylinder while sinking, the pressure will open the relief valve 40 at the predetermined set pressure for relief. Once the pressurized hydraulic fluid passes through relief valve 40, the fluid will enter the hydraulic motor 36 and cause it to begin to spin. The fluid then passes through the hydraulic motor 36 and through check valve 30 and into the pressurized tank 24 by way of inlet 34. When the pressurized hydraulic fluid has a pressure greater than the preset pressurization or spring force of the pressurized tank 24, the pressurized tank 24 will begin to fill with hydraulic fluid while compressing the pressurized or spring-loaded wall of the pressurized tank 24. Due to the pressure experienced at end 20 of check valve 18 being greater than the pressure experienced at end 28 of check valve 18, hydraulic fluid will not travel through check valve 18. Eventually, the piston 16 will stop moving, either by reaching the end of its designed travel or by reaching the end of the pressurized tank 24 wall travel. At this point, the motor 36 and other attached components will also stop moving.

Once ballast tank 12 changes the system buoyancy to positive, the system will begin to rise in the water column. Rising will decrease the hydrostatic pressure experienced on the cylinder face of cylinder 16. At some depth, during the rising process, the pressure experience on the cylinder face will be less than the pressure or force exerted by the compressed pressurized tank 24 wall. At that point, hydraulic fluid will begin to move out of pressurized tank 24 through check valve 18. The fluid cannot travel through check valve 30 due to the orientation of the valve. Once fluid passes through check valve 18, the fluid will begin to fill the hydraulic cylinder 16.

Flooding Valve 14c

The system 10 according to the present invention may use any commercially available flooding valve.

Figure 8:
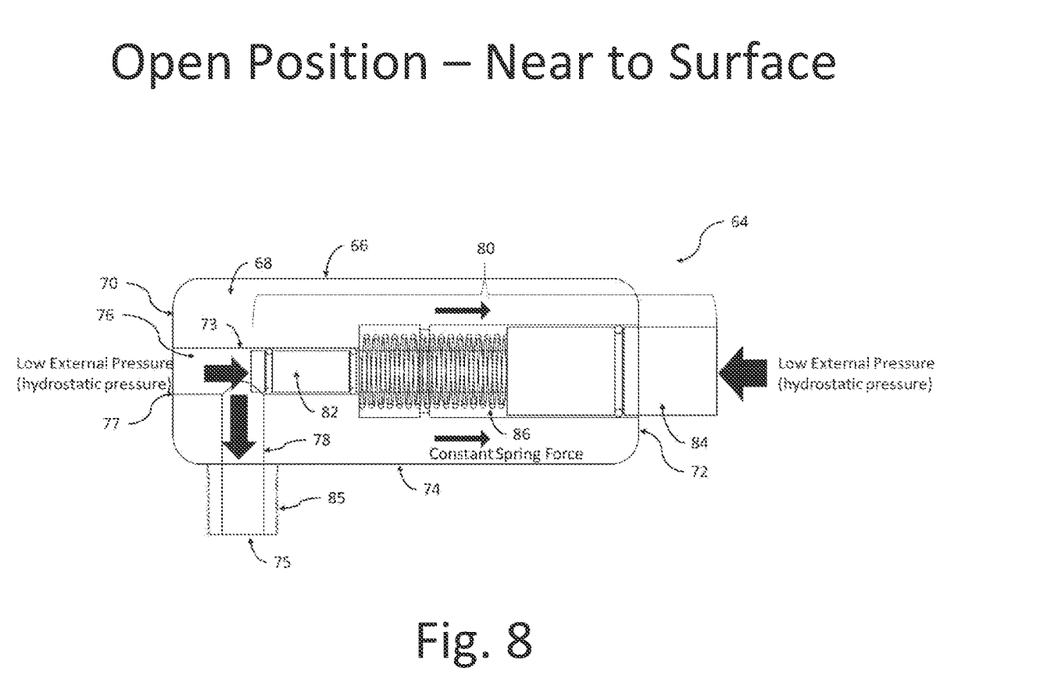
FIG. 8 shows a side view of the special flooding valve according to an embodiment of the present invention in an open position.
Figure 9:
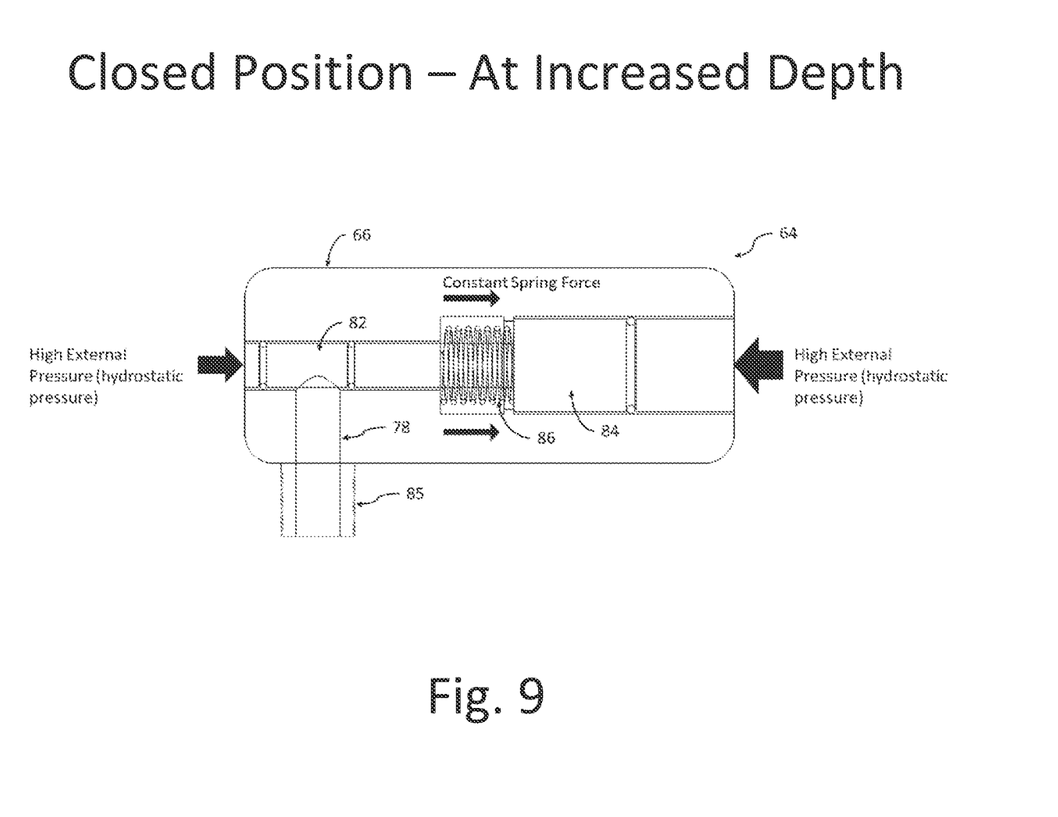
FIG. 9 shows a side view of the special flooding valve according to an embodiment of the present invention in a closed position.

In one embodiment, the present invention uses as a flooding valve 14c a special designed flooding valve 64. In this embodiment, the flooding valve 64 automatically opens and closes utilizing the change in hydrostatic pressure as depth changes.

The flooding valve 64 includes a case 66 having a hollow interior 68, a first side 70, a second side 72, a bottom side 74, an inlet 77 located on the first side 70, a t-shaped conduit 73 located inside the case 66. The T-shaped conduit 73 having a horizontal section 76 running from the first side 70 to the second side 72 of the case 66 and a vertical section 78 running from the horizontal section 76 near the inlet 77 towards an outlet 75 located at the bottom side 74 of the case 66. A plunger 80 is slidable inside the horizontal section 76. The plunger 80 includes a small plug 82, a large plug 84, and spring 86 between a small plug 82 and the large plug 84, where the small plug 82 is situated through the center of spring 86 and the large plug 84 comes in contact with one end of spring 86. The small plug 82 is placed towards the first side 70 of the case 66 and the large plug 84 is located towards the second side 72 of the case 66. A fastener connector 85 may be placed on case 66 extending the outlet 75 outside the case 66.

When in shallow depths, the spring 86 and the hydrostatic pressure exerted to the surface area of small plug 82 would drive the large plug 84 back in order to allow flow through the inlet 76. When in deep depths, the hydrostatic pressure exerted to the surface area of the large plug 84 will overcome the spring 86 and the hydrostatic pressure exerted to the surface area of small plug 82 and maintain the valve 64 in the closed position.

Figure 11:
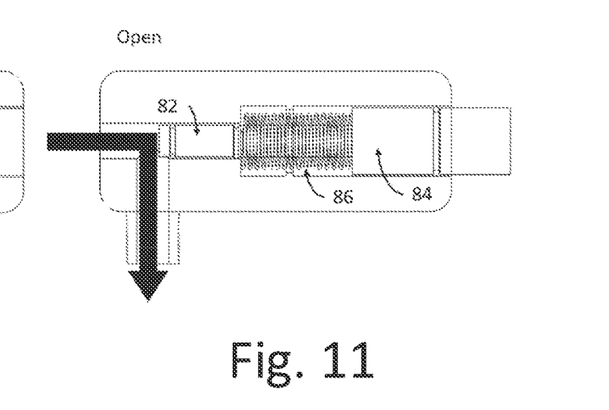
FIG. 11 shows a side view of the special flooding valve according to an embodiment of the present invention, showing the fluid travel path in an open position.

When hydrostatic pressure decreases, the small plug 82 slides inside the horizontal section 76 of the t-shaped conduit 73 towards the second side of the case allowing the fluid to enter through the inlet 77 and flow towards the outlet 75 of the case filling the ballast tank 12.

Figure 10:
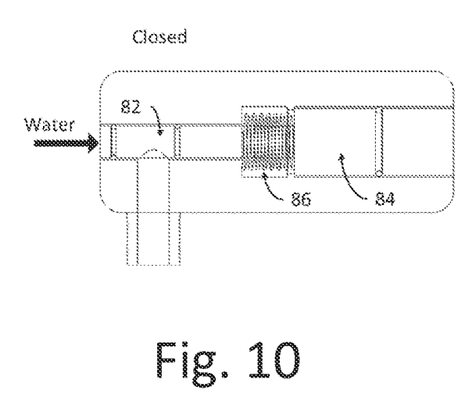
FIG. 10 shows a side view of the special flooding valve according to an embodiment of the present invention, showing the fluid travel path in a closed position.

When hydrostatic pressure increases, the large plug 84 slides towards the first side 70 of the case preventing the fluid from entering the inlet 77.

In shallow depths, the valve 64 will open, flooding the ballast tank 12, causing the system 10 to sink. As the system 10 sinks and hydrostatic pressure increases, the valve 64 will close, no longer allowing fluid to enter the ballast tank 12. If the ballast system pumps out water, thus allowing the system to rise, the valve 64 will open once a specific shallow depth range is reached, thus automatically flooding the ballast tank 12 again.

In one embodiment, a portion of the large plug 84 protrudes from the second side 72 of the case 66. In this embodiment, a cover (not shown) may be used to protect the protrude portion of the large plug 84.

In one embodiment, the present invention replaces the spring 86 with the use of compressed gas or liquid, magnets, or any physical material that acts in a similar manner to a spring when compressed could be utilized.

The case 66 may be a watertight case under pressure.

In another variation, the small or large plugs can be configured to be attached to another body or piping, i.e. the large side can be exposed to hydrostatic pressure, but the smaller side can be piped into a different fluid. This configuration would allow for a system to transfer an internal fluid (not seawater) within the system automatically via the change in hydrostatic pressure.

Check Valves 18, 30

In one embodiment, the valves 18 and 30 are the same. Valves 18 and 30 may have different body sizes, orifices sizes, and/or robustness.

Check valves act as a one-way valve for the fluid. This ensures that fluid does not back drive the hydraulic system. In places where check valves are not ideal, the system prevents back flow from hydraulic pressure through the resisting line.

Pressurized Tank 24

The pressurized tank 24 is filled during the sinking phase because the force due to pressure from the piston 16, due to hydrostatic pressure, will exceed the force of the pre-pressurized wall. But once the hydrostatic pressure is relieved near the top of the rising cycle, the pressurized portion will begin to squeeze the fluid, moving back through the piping.

The pressurized tank 24 may be, for example, a gas filled bladder tank.

In one embodiment, the tank 24 may be a pressurized tank similar to one designed to hold water when the piping system sees excessive pressure (in order to prevent pipes from bursting).

In one embodiment, the pressurized tank 24 may include a pressurized body utilizing springs, magnets, or any mechanical means of adding pressure to the hydraulic fluid.

The pressurized tank 24 is connected to the hydraulic motor 36 by hydraulic conduit.

The pressurized tank 24 has an internal portion that is set to a predetermined pressure. This can be accomplished through springs, pressurized gas, or other means. The pressure of the tank will be easily overcome after depth is achieved by the system and a greater pressure is applied to the hydraulic fluid. From here, the tank acts simply as a holding spot for the hydraulic fluid. When ambient hydrostatic pressure is relieved, the compressed pressurized area can now act on the hydraulic fluid to push it back into the cylinder past check valve 18.

Hydraulic Motor 36

There are several types of commercially available motors with different internal technology. Types of hydraulic motors include Axial Piston Motors, Radial Piston Motors, Gear Motors, Vane Motors, and others. The specific motor construction chosen depends on the specifications of other components in the invention.

Relief Valve 40

A relief valve is included in the system to prevent system movement until a desired pressure is reached. This could have several positive effects, like ensuring smoother motor movement, but by design, may not be necessary.

The present invention may use, for example, a general pilot operated relief valve.

Generator 50

The generator will be mechanically coupled to the motor shaft of the motor 36. If the design intent calls for it, a gearbox can be used between the motor shaft and generator shaft in order to convert the motor input into desired speed or torque magnitudes before inputting into the generator shaft.

The generator 50 generates electrical power and may be attached to a power grid 60 or charge the battery 56.

Once the generator begins to spin, the power generated will have two purposes: operation of the electronics that control the ballast system and storage. The end goal of the system is to generate enough power to operate both functions of the ballasting system, flooding and expelling.

The present invention contemplates the use of an electrical control or computing to direct voltage at certain times and in certain quantities.

Gearbox 54

The gearbox may be any commercially available gear box. The gearbox 54 is designed to convert high speed with low torque into low speed with high torque or vice versa. In this invention, the hydraulic motor 36, depending on the type chosen, would most likely be producing high torque with low speed that would need to be converted into high speed for maximum RPM on the shaft of the generator 50.

The gearbox 54 is displayed between the hydraulic motor 36 and the generator 50. The gearbox 54 is technically not needed, however, due to the nature of hydraulics, it is expected that the hydraulic motor 36 will produce high torque with low speed. Through a gearbox, this torque can be converted into a high rpm (revolutions per minute) input into the generator for maximum power generation. If the total system is designed in such a way as to not need this conversion, then the gearbox would not be necessary.

During the working on the power generation system 5 of the present invention, there are several stages.

The first stage is flooding: The system life cycle starts by opening a flooding port to let in a controlled amount of fluid. For its initial setting, this fluid will already be present in the system.

Figure 2:
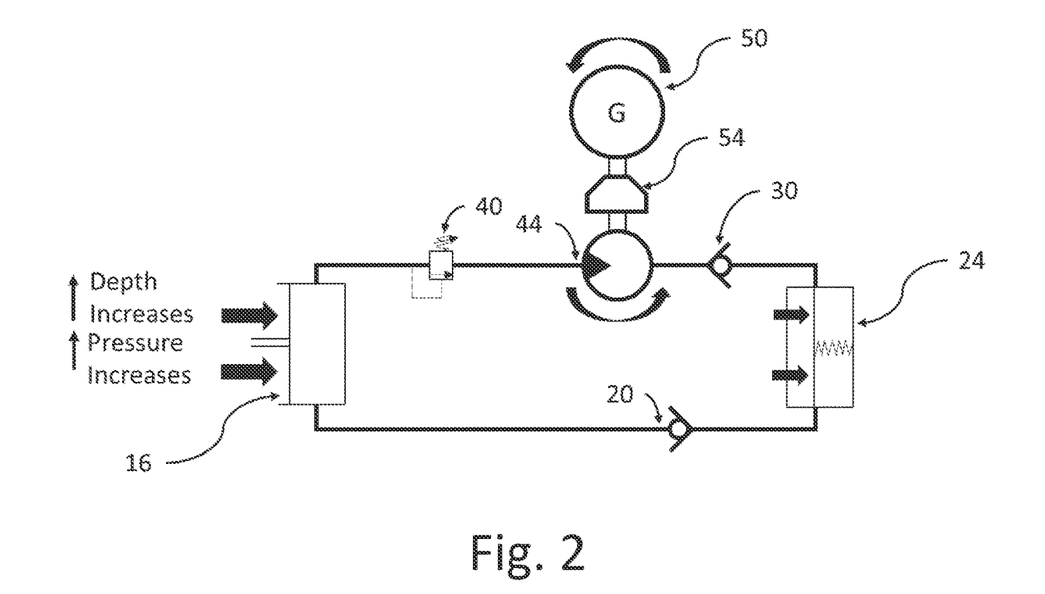
FIG. 2 shows a schematic view of the hydraulic cycles process as the power generation system of FIG. 1 during the sinking step.

The second stage is sinking (FIG. 2): The hydraulic fluid is pressed through the hydraulic motor and fills a pressurized tank. Check valves prevent fluid from traveling in full loop. Fluid motion stops once the system hits equilibrium.

The third stage is expelling: Once enough electrical potential has been generated by the internal hydraulic system and a specific depth has been reached (these calculations are all dependent on numerous factors), the system will utilize the generated electricity to power a ballast pump to expel a controlled amount of the fluid, thus causing the system to have positive buoyancy.

Figure 3:
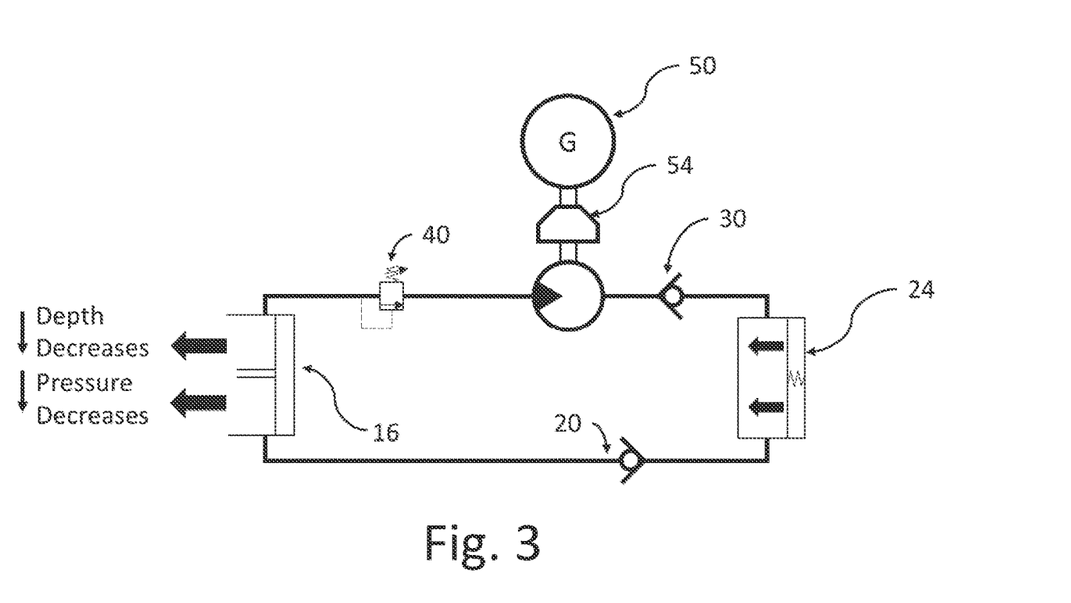
FIG. 3 shows a schematic view of the hydraulic cycles process as the power generation system of FIG. 1 during the rising step.

The fourth stage is rising (FIG. 3): Once the system is positively buoyant, the system will begin rising. When rising, the pressurized tank pushes the hydraulic fluid back to the hydraulic cylinder past a check valve. The decreasing ambient pressure acts as a form of suction, drawing the fluid into the cylinder. A separate check valve prevents the fluid from back driving the hydraulic motor. While rising, external pressure will alleviate. This will cause the hydraulic system to reset. Though it is technically possible to draw residual energy from the process of resetting, that is not represented here.

Power Generation:

There are many ways to achieve the same outcome using a variety of hydraulic components, valves, manifolds, etc. The drawn schematic is a simplified form of the ideal hydraulic system. More components, different components, or redundancy, may be ideal based on other factors that the system will see.

The present invention contemplates the use of several power generation systems working together to send energy to one or multiple power banks.

As shown here, the system only generates power through the sinking phase. It is possible to also generate power in the rising phase, however it is expected that these returns would be minimal and potentially impede on the transfer of hydraulic fluid. Therefore, it was decided that it would not be included in this system's most basic form.

In an embodiment (FIG. 5), the power is capitalized solely during the rising phase. In this design, the system would be driven by the set pressure applied by the pressurized tank. Then the sinking phase merely compresses the spring or pressurized volume until at or past equilibrium. In the rising phase, the elevated ambient pressure coupled with the oversized spring pressure or high pre-charged pressure would drive the hydraulic motor for power generation. As mentioned in the previous variation, there can be residual power generation in the sinking phase with this orientation of components, but that is not depicted for simplicity.

Figure 6:
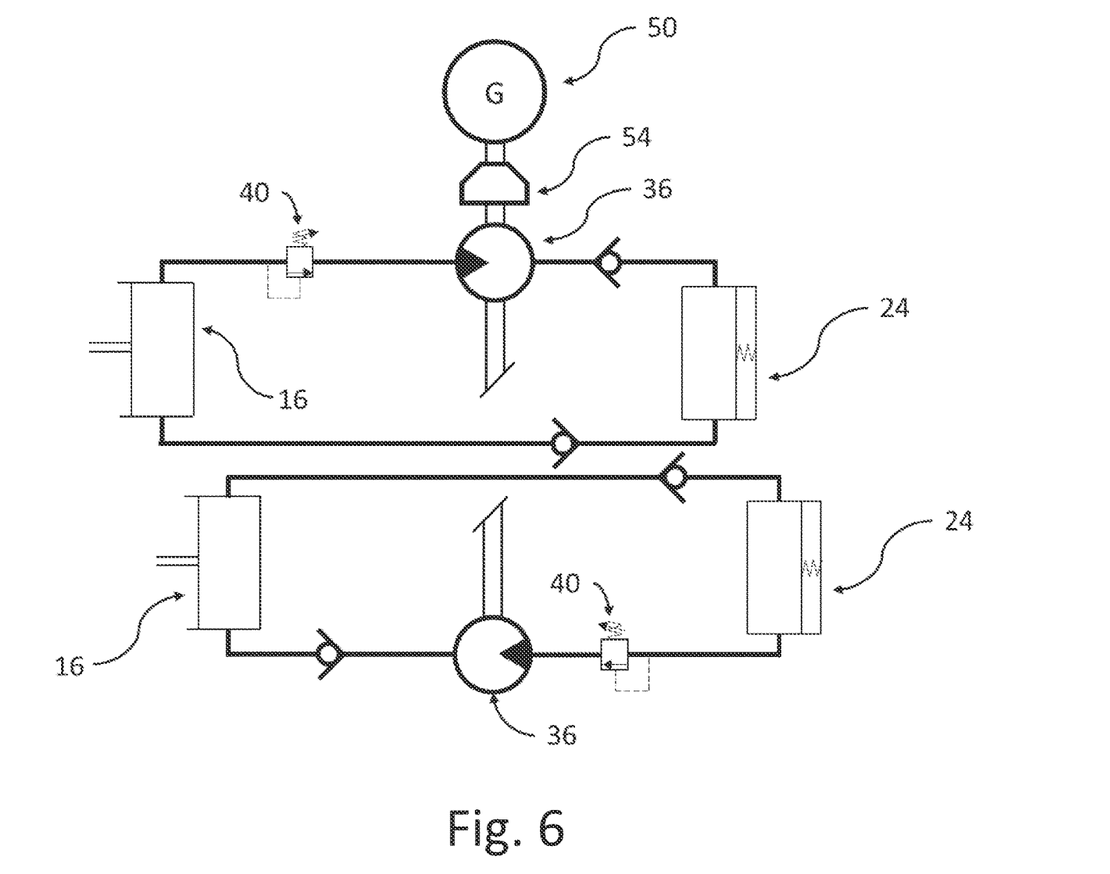
FIG. 6 shows an embodiment of the present invention, showing two motors coupled to the same input shaft leading to the gearbox and generator.

In an embodiment, a simplistic representation is configured with a linear transfer of hydraulic fluid. Though valves may be utilized for a variety of applications, none are depicted here. This system transfers fluid to the motor during the sinking phase generating power then filling a pressurized tank with fluid. During the rising phase, the hydraulic fluid travels back through the system, through the motor, and back to the piston. Though not required, a slip clutch is depicted to allow the transfer of rotation to the generator or gearbox shaft during the sinking phase but not transferring rotation during the rising phase. The slip direction of the slip clutch can be changed and the pressurized tank can be fitted with an oversized spring pressure or high pre-charged pressure in order to change which phase generates energy. Removal of the slip clutch allows for the generation of energy in both directions; however, the generator must be designed to accept both directions of rotation. FIG. 6 shows an embodiment of the present invention. In this embodiment, it utilizes both previously mentioned variations in unison. Both motors would be coupled to the same input shaft leading to the gearbox and generator. The hydraulic motors would be attached in such a way as to slip over the shaft when not driving the shaft in order to prevent hydraulic lock or resistance to rotation.

In an embodiment, the entire system would use two hydraulic systems configured in both manners (power generation during sinking and power generation during rising), with both hydraulic motors coupled to the same shaft that eventually powers the generator. This would allow for power generation in both phases.

As the hydraulic system generates power during sinking, that power is both stored and used to power an on-board computer/controller. Once the controller has identified that enough power has been generated to operate the ballast pump and the flood valve, the controller will operate the pump to expel fluid. Once the system has risen to a sufficient depth, through depth sensors or other devices of electrically or mechanically determining altitude, the controller, if needed, will operate the flood valve. The controller will then be dormant until the hydraulic system begins power generation.

The flood valve, depth sensor, or other component functionality can be achieved through a variety of mechanical and/or electrical devices known in the art.

Figure 5:
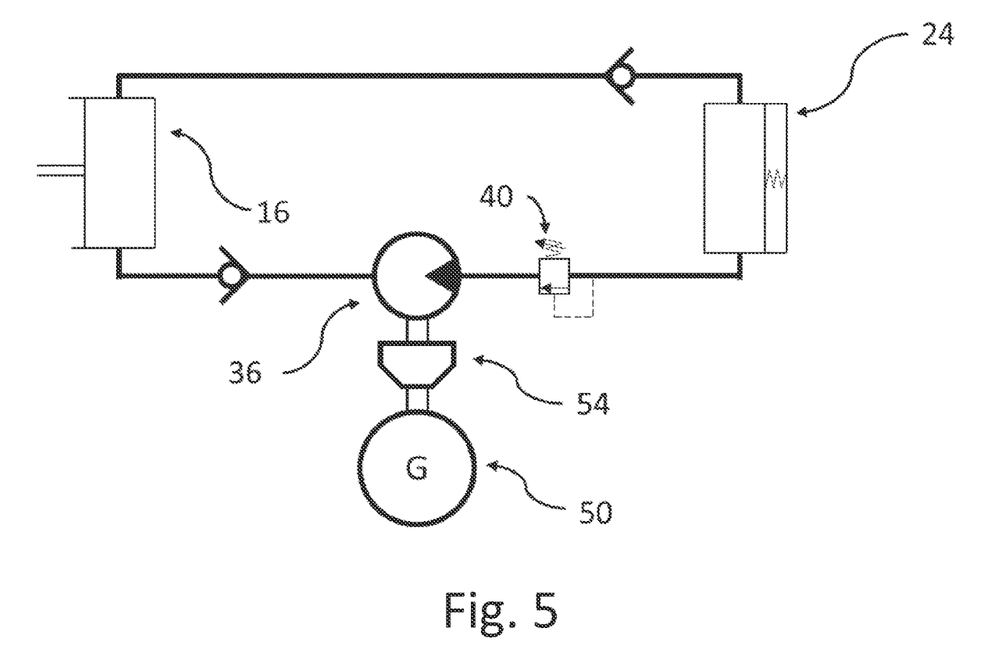
FIG. 5 shows an embodiment of the present invention, wherein energy is produced during the rising step.
Figure 7:
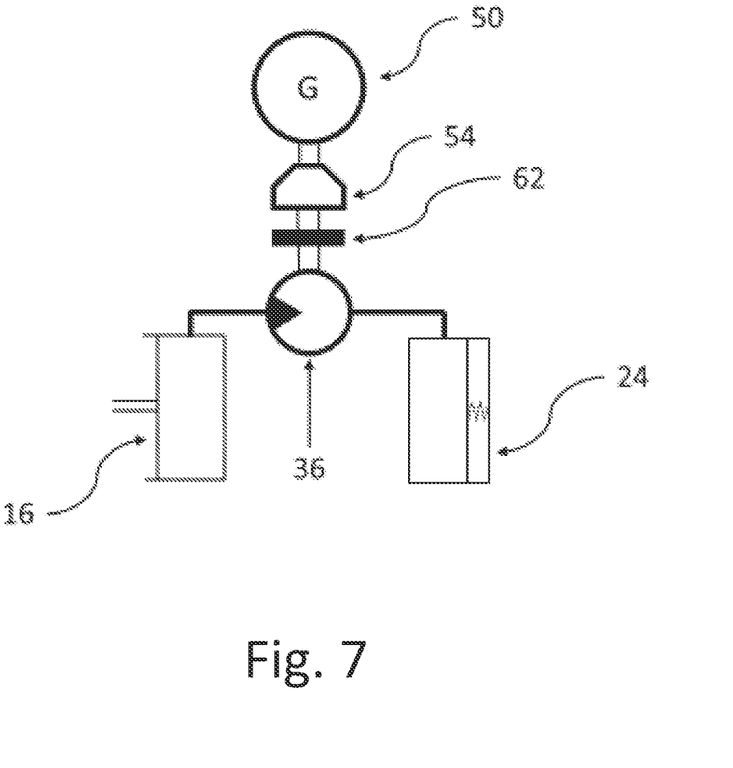
FIG. 7 shows an embodiment of the present invention, showing a slip clutch and a linear system where the hydraulic fluid changes direction through the lines.

FIG. 7 shows an embodiment similar to the embodiment of FIG. 5. In this configuration, the hydraulic fluid pressurizes during the sinking phase in the piston. That fluid will spin the motor and generator in the same manner. The fluid will then fill the pressurized tank. The main difference during the rising phase is without the check valves present, the fluid can now travel back through the motor as it returns to the piston. The addition of a slip clutch is optional if the generator cannot handle rotation in both directions or if the motor resistance (mechanical resistance to turning) is too high for the pressurized force of the pressurized tank.

A slip clutch is a one-way clutch. For instance, it will lock the adjoining shafts together in the clockwise rotation but will slip by (not transferring rotation) in the counterclockwise direction.

FIG. 7 shows an embodiment of the present invention showing a slip clutch 62 located between the motor 36 and the generator 50 or between the motor 36 and the gearbox 54 when the last one is present. In this embodiment, the hydraulic system is no longer a one directional loop, but rather a linear system where the hydraulic fluid changes direction through the lines (fluid changes direction).

The foregoing has described a power generation system 5 for generating electricity using the increasing pressure of an object during sinking. While specific embodiments of the present invention have been described, it will be apparent to those skilled in the art that various modifications thereto can be made without departing from the spirit and scope of the invention. Accordingly, the foregoing description of the preferred embodiment of the invention, and the best mode for practicing the invention, are provided for the purpose of illustration only and not for the purpose of limitation.

The invention claimed is:

1. A power generation system (5), comprising:
a housing (10) including a cavity (7), an inlet (14), is adapted to receive a fluid, and an outlet (14b);
a ballast tank (12) is located inside the cavity (7) of the housing (10), the ballast tank (12) having a first end (12a) and a second end (12b) including an inlet (14a) connected to a flooding valve (14c), the one flooding valve (14c), is in fluid communication with the inlet (14), of the housing (10);
a hydraulic system located inside the cavity (7) of the housing and including:
a hydraulic cylinder (16);
a first relief valve (40) having a first end (46) connected to an outlet (48) of the hydraulic cylinder (16);
a hydraulic motor (36) having a first end (44a) connected to a second end (42), of the relief valve (40) and a second end (44b) connected to an inlet (38), of check valve (30);
the check valve (30) has a second end (32) connected to the inlet (34) of the tank (24) and receives and stores under pressure the fluid received from the hydraulic motor (36);
a second check valve (18) having a first end (28) connected to an outlet (26) of the tank (24), the second check valve (18) has a second end (20) that is connected to an inlet (22) of the hydraulic cylinder (16);
a generator (50) connected to a third side shaft (52), of the hydraulic motor (36), the generator (50) is mechanically coupled to the hydraulic motor (36) to receive and use the pressurized fluid to generate electrical energy;
optionally, a gearbox (54) located between the generator (50) and the hydraulic motor (36);
a battery (56), connected to the generator (50) and electronics (56a), connected to the battery (56); and
the ballast tank (12) further including:
a ballast pump (54) connected to the battery (56);
wherein when a controlled amount of a fluid enters through the inlet (14a) of the ballast tank (12), then the system (10) starts sinking by changing from a positive buoyancy to a negative buoyancy and as the depth of the system (10) increases, an external hydrostatic pressure increases, moving the hydraulic cylinder (16) from a first position to a second position, the movement of the hydraulic cylinder (16) sends the pressurized fluid into the hydraulic motor (36), which in turn activates the generator (50), which in turn produces electrical energy, and the pressurized fluid leaves the hydraulic motor (36) into a tank (24);
wherein when a predetermined amount of the electrical energy has been generated and/or a specific depth has been reached, the ballast pump (54), is activated by the on-board electronics (56a) to expel a predetermined amount of the fluid;
wherein when the predetermined amount of the fluid is expelled, the system starts rising, by changing from negatively buoyant to positively buoyant; and
wherein when rising, the external pressure decreases and the hydraulic cylinder moves from the second position to the first position with the aid of other internal forces.

2. The power generation system according to claim 1, wherein the tank is a pressurized tank.

3. The power generation system according to claim 1, wherein the tank includes inside a pressurized body.

4. The power generation system according to claim 1, wherein the flooding valve includes:

a case having a hollow interior, a first side, a second side, a bottom side, an inlet located on the first side, and an outlet located at the bottom side of the case;

a t-shaped conduit located inside the case, the t-shaped conduit having a horizontal section running from the first side to the second side of the case and a vertical section running from the horizontal section near the inlet towards the outlet of the case;

a plunger is slidable inside the horizontal section and the plunger includes a small plug, a large plug, and spring between a small plug and the large plug;

wherein the small plug is placed towards the first side of the case and the large plug is located towards the second side of the case;

wherein when hydrostatic pressure decreases, the small plug slides inside the horizontal section of the t-shaped conduit towards the second end of the case allowing the fluid to enter through the inlet and flow towards the outlet of the case filling the ballast tank;

wherein when hydrostatic pressure increases, the large plug slides towards the first end of the case preventing the fluid from entering the case.

\* \* \* \* \*